(12) United States Patent
Wehrmann

(10) Patent No.: US 10,864,681 B2
(45) Date of Patent: Dec. 15, 2020

(54) PLASTIC MOULDING FOR A MOULDING ARRANGEMENT, CORRESPONDING MOULDING ARRANGEMENT, AND METHOD FOR PRODUCING A MOULDING ARRANGEMENT

(71) Applicant: AFT AUTOMOTIVE GMBH, Greven-Reckenfeld (DE)

(72) Inventor: Christoph Wehrmann, Wettringen (DE)

(73) Assignee: AFT AUTOMOTIVE GMBH, Greven-Reckenfeld (DE)

( * ) Notice: Subject to any disclaimer, the term of this patent is extended or adjusted under 35 U.S.C. 154(b) by 42 days.

(21) Appl. No.: 16/469,846

(22) PCT Filed: Dec. 11, 2017

(86) PCT No.: PCT/EP2017/082239
§ 371 (c)(1),
(2) Date: Jun. 14, 2019

(87) PCT Pub. No.: WO2018/114437
PCT Pub. Date: Jun. 28, 2018

(65) Prior Publication Data
US 2019/0322054 A1    Oct. 24, 2019

(30) Foreign Application Priority Data
Dec. 19, 2016    (DE) .................. 10 2016 225 415

(51) Int. Cl.
*F16L 25/01*    (2006.01)
*F16L 47/02*    (2006.01)
(Continued)

(52) U.S. Cl.
CPC .... *B29C 65/1635* (2013.01); *B29C 66/12441* (2013.01); *B29C 66/12469* (2013.01);
(Continued)

(58) Field of Classification Search
CPC .......... B29C 65/1635; B29C 66/12441; B29C 66/12469; B29C 66/522; B29C 66/5344;
(Continued)

(56) References Cited

U.S. PATENT DOCUMENTS

| 6,199,916 | B1 | 3/2001 | Klinger et al. |
| 2004/0140668 | A1 | 7/2004 | Monsheimer et al. |

(Continued)

FOREIGN PATENT DOCUMENTS

| DE | 698 23 351 T2 | 3/2005 |
| DE | 20 2007 006954 U1 | 9/2008 |

(Continued)

OTHER PUBLICATIONS

International Preliminary Report on Patentability from Corresponding International Application No. PCT/EP2017/082239 dated Nov. 9, 2018.

(Continued)

*Primary Examiner* — Michael C Miggins
(74) *Attorney, Agent, or Firm* — Pearne & Gordon LLP

(57) ABSTRACT

The application relates to a plastic moulding for a moulding arrangement including a housing for another plastic moulding of the moulding arrangement, wherein the housing is formed within a moulding body of the plastic moulding including a weldable material in at least some areas. It is contemplated therein that a contact element is arranged on the moulding body, the contact element at least partly including an electrically conductive material and limiting a recess of the moulding body adjoining the housing in at least some areas. The application further relates to a moulding arrangement and a method for producing a moulding arrangement.

14 Claims, 3 Drawing Sheets

(51) Int. Cl.
*B29C 65/16* (2006.01)
*B29C 65/00* (2006.01)
*B29K 105/00* (2006.01)
*B29K 505/00* (2006.01)
*B29K 507/04* (2006.01)
*B29L 31/24* (2006.01)

(52) U.S. Cl.
CPC ........ *B29C 66/522* (2013.01); *B29C 66/5344* (2013.01); *B29C 66/612* (2013.01); *B29C 66/71* (2013.01); *B29C 66/723* (2013.01); *B29C 66/73141* (2013.01); *B29C 66/73921* (2013.01); *F16L 25/01* (2013.01); *F16L 47/02* (2013.01); *B29K 2105/0023* (2013.01); *B29K 2505/00* (2013.01); *B29K 2507/04* (2013.01); *B29K 2995/0005* (2013.01); *B29L 2031/24* (2013.01)

(58) Field of Classification Search
CPC ..... B29C 66/612; B29C 66/71; B29C 66/723; B29C 66/73141; B29C 66/73921; F16L 25/01; F16L 47/02; B29K 2105/0023; B29K 2505/00; B29K 2507/04; B29K 2995/0005; B29L 2031/24
See application file for complete search history.

(56) References Cited

U.S. PATENT DOCUMENTS

| | | | |
|---|---|---|---|
| 2011/0074145 | A1 | 3/2011 | Schwarzkopt et al. |
| 2019/0126563 | A1 | 5/2019 | Hemker et al. |

FOREIGN PATENT DOCUMENTS

| | | |
|---|---|---|
| DE | 102016204066 A1 | 9/2017 |
| EP | 1 403 030 A1 | 3/2004 |
| WO | 2008/068328 A2 | 6/2008 |

OTHER PUBLICATIONS

International Search Report from Corresponding International Application No. PCT/EP2017/082239 dated Mar. 7, 2018.
Written Opinion from Corresponding International Application No. PCT/EP2017/082239 dated Mar. 7, 2018.

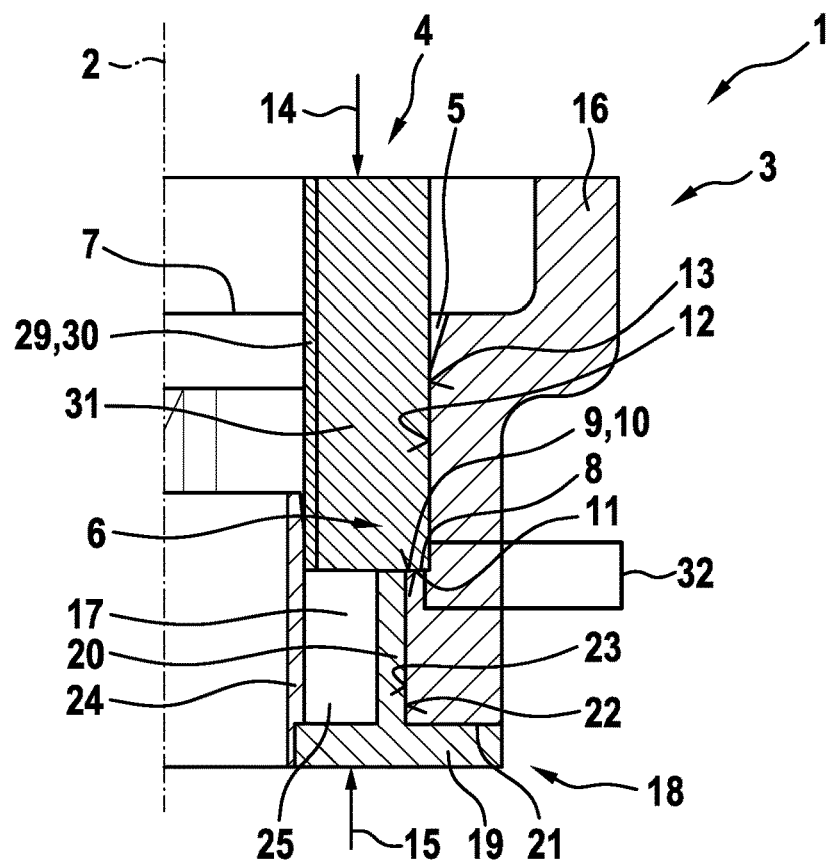
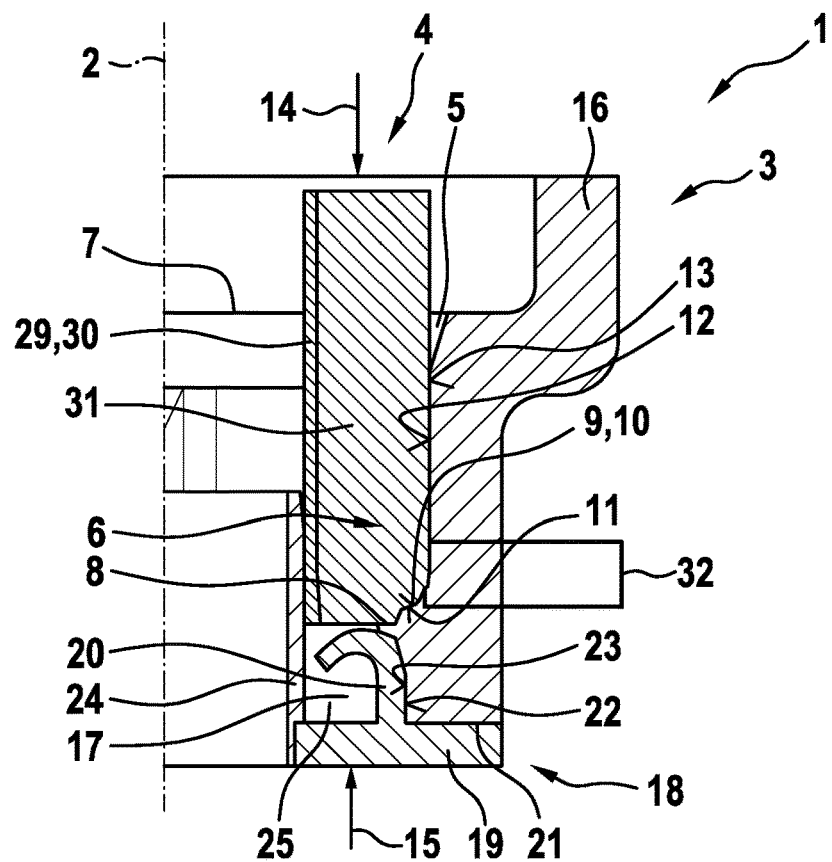

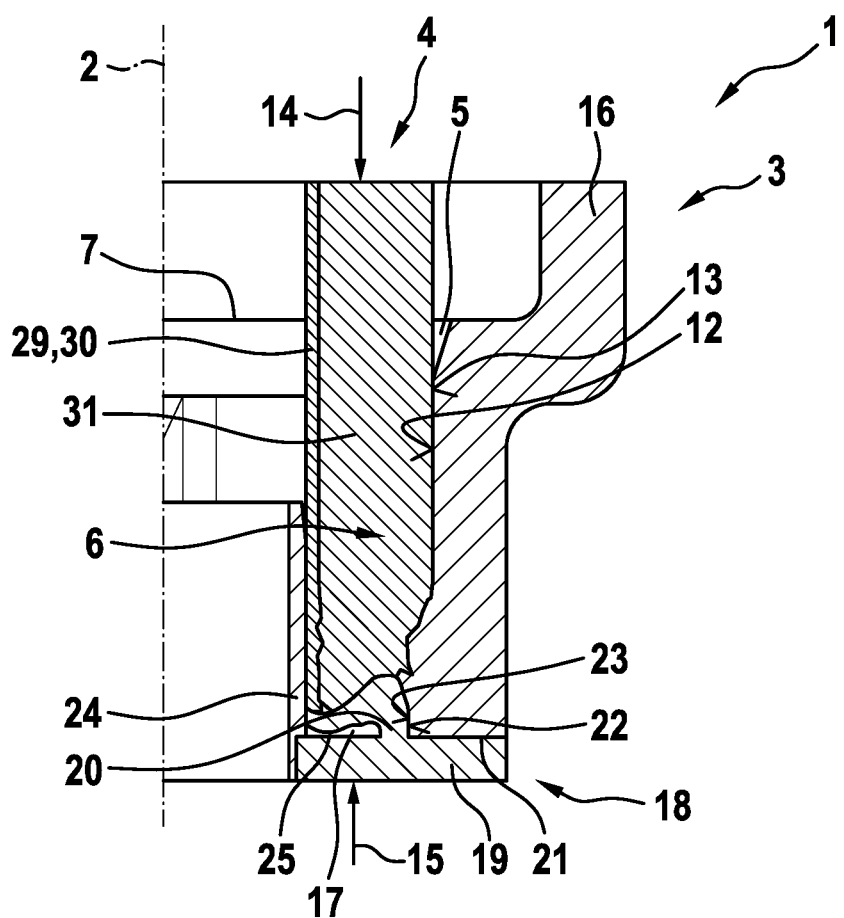

PLASTIC MOULDING FOR A MOULDING ARRANGEMENT, CORRESPONDING MOULDING ARRANGEMENT, AND METHOD FOR PRODUCING A MOULDING ARRANGEMENT

FIELD OF THE INVENTION

The invention relates to a plastic moulding for a moulding arrangement including a housing for another plastic moulding of the moulding arrangement, wherein the housing is formed within a moulding body of the plastic moulding consisting of a weldable material in at least some areas. The invention further relates to a moulding arrangement and a method for producing a moulding arrangement.

BACKGROUND OF THE INVENTION

For example, the plastic moulding is present as a component part of the moulding arrangement which includes the other plastic moulding alongside the plastic moulding. In this respect, the plastic moulding can also be referred to as a first plastic moulding and the other plastic moulding as a second plastic moulding. It is contemplated to produce or form, respectively, the plastic moulding and the other plastic moulding separately from one another and to subsequently produce the moulding arrangement from the plastic moulding and the other plastic moulding by joining the plastic moulding and the other plastic moulding, specifically by welding, preferably by laser welding. However, other welding techniques can also be used, such that welding is performed as spin welding, hot gas welding, infrared welding, vibration welding, ultrasound welding, friction welding, or high-frequency welding.

In order to enable welding, the plastic moulding consists of the weldable material in at least some areas, wherein the weldable material is arranged on the plastic moulding such that it melts during welding and forms a substance-to-substance connection of the plastic moulding to the other plastic moulding. In order to form the moulding arrangement, i.e. to connect the plastic moulding to the other plastic moulding, the latter is arranged within the housing of the plastic moulding. The housing is present in the moulding body of the plastic moulding which consists of the already mentioned weldable material in at least some areas.

As an example, the plastic moulding and the other plastic moulding are each present as a fluid conducting element. Preferably, the plastic moulding is a fluid coupling, particularly a fluid quick-coupling, whereas the other plastic moulding is a fluid conduit or a fluid tube. Such fluid coupling and fluid conduit arrangements are often used in the field of motor vehicles such as for producing a fuel connection. It may be contemplated that the plastic moulding and the other plastic moulding are produced using different production processes. As an example, the plastic moulding is formed by injection moulding and the other plastic moulding is formed by extrusion. In this respect, the plastic moulding can be present as an injection-moulded moulding and the other plastic moulding can be present as an extrusion moulding.

For example, published patent application WO 2008/068328 A2 is known from the prior art. It describes a method of laser welding of at least two members made of plastic, in particular of a tube and a support plate, wherein the first member has a relatively high permeability in at least some areas for a laser beam used in laser welding and wherein the second member has a relatively low permeability in at least some areas for the laser beam used in laser welding. A compact construction should be achieved by the laser beam reaching the respective weld joint during laser welding by refraction and/or reflection. At best, such a strategy can only be monitored with very high effort. From a technical point of view, corresponding devices can only be implanted with difficulty and at high costs.

BRIEF SUMMARY OF THE INVENTION

The object of the invention is to propose a plastic moulding for a moulding arrangement having advantages over known plastic mouldings, in particular enabling reliably and process-stably connecting the plastic moulding to the other plastic moulding on the one hand and electrically contacting the plastic moulding to the other plastic moulding on the other hand.

According to the invention, this is achieved with the plastic moulding having the features of claim 1. It is contemplated therein that a contact element is arranged on the moulding body, the contact element at least partly consisting of an electrically conductive material and limiting a recess of the moulding body adjoining the housing in at least some areas.

In particular if the moulding arrangement and thus the plastic moulding and other plastic moulding are configured for supplying fuel in the field of motor vehicles, it is necessary to create electrical contacting between the plastic moulding and the other plastic moulding in order to prevent electrostatic charge. The requirements of such an electrical contacting have been incorporated into numerous standards such as SAE J1645 and VW TL52712. Therein, a sheet resistance or a surface resistivity of less than 10E+06 Ω/square or a volume resistivity of less than 10E+06 Ωcm are required.

In order to enable electrical connection of the other plastic moulding to the plastic moulding, the latter includes a contact element preferably mounted to the moulding body or embodied as an insert. In the former case, the contact element can be press-fitted into the moulding body, mounted to it by lock-mounting or welding. In the configuration as an insert, the contact element is only loosely inserted into the moulding body. In particular, prior to welding, the contact element is loosely present within the moulding body. Preferably, the contact element is joined to the moulding body via a substance-to-substance connection during welding. The contact element at least partly consist of the electrically conductive material which can be laser absorbing at the same time. As an example, plastic is used as the material, the plastic being rendered electrically conductive using at least one additive. As the additive, carbon is preferably used which in particular is admixed to the plastic in the form of carbon fibres and/or carbon black. Alternatively or additionally, a metal such as iron, copper or a respective alloy can be included as the additive. It is understood that the use of a different additive is also possible as long as the material's electrical conductivity can be established with it. However, the plastic can also be intrinsically conductive, such as by realising a conjugated double bond.

Preferably, the contact element and the moulding body consist of the same basic material, specifically of the same carbon. However, the contact element's material can differ from the moulding body's material with respect to the at least one additive. Thus, as an example, the contact element's material is composed of the basic material and the at least one additive while the moulding body's material corresponds to the basic material to which at least one other additive or no additive is added.

Most preferably, the contact element's material is laser absorbing whereas the moulding body's material is laser transparent. For the wavelength or the wavelength range of the laser beam or laser light used for laser welding, a laser transparent material has a higher transmittance than the laser absorbing material. Thus, reversely, the laser absorbing material has a higher opacity for the wavelength or the wavelength range of the laser beam or laser light than the moulding body's material.

The moulding body's material and/or the contact element's material are weldable with a material of the other plastic moulding, specifically e.g. via laser welding. This means that the contact element's material and/or the moulding body's material can make a substance-to-substance connection with the material of the other plastic moulding or be brought into such a connection by welding. For example, in the case of laser welding, the laser beam used is oriented such that it first passes through the plastic moulding, in particular the moulding body, and reaches the other plastic moulding at least partly through the plastic moulding and the moulding body, respectively. Thus, the laser beam is at least partly oriented towards the plastic moulding. Preferably, the laser beam or part of the laser beam reaching the plastic moulding fully penetrates the plastic moulding and the moulding body, respectively—at least when seen in half-section. This is achieved through a corresponding transmittance of the moulding body's material.

In contrast, the other plastic moulding may consist of a laser absorbing material in at least some areas. Accordingly, energy is input into the other plastic moulding via the laser beam during laser welding where it is transformed into heat in the laser absorbing material. Heat is also input into the material in other welding methods. Consequently, the other plastic moulding heats up in some areas or at least in some areas during welding, for example under the laser beam's impact. During welding, the other plastic moulding or the plastic moulding's material is melted in some areas due to the heat generated during welding which results in a substance-to-substance connection of the other plastic moulding to the plastic moulding, specifically in particular to the moulding body of the plastic moulding.

Additionally or alternatively, the heat accumulating in the other plastic moulding can be transferred from the other plastic moulding to the plastic moulding by thermal transfer such that the temperature of the latter also increases. This can result in the plastic moulding or the plastic moulding's material also being melted in some areas or at least in some areas and combines with the other plastic moulding or the other plastic moulding's material, in particular with the melted part of the other plastic moulding or with the melted material of the other plastic moulding. In order to enable laser welding, the moulding body's material preferably is laser transparent. For other welding methods, this does not necessarily have to be the case. As the actions mentioned above for achieving an electric conductivity of a material require incorporation of the at least one additive, in particular of carbon, the electrically conductive material, specifically in particular the contact element's material, can be laser absorbing. Conversely, this means that the plastic moulding's material is not electrically conductive. However, it is understood that a material may be utilised which is laser transparent and still conductive. As an example, the additive is chosen accordingly for this purpose.

In particular, if the moulding body's material is not electrically conductive, such a contact element is provided which ensures electrical connection of the two plastic mouldings. The contact element limits the plastic moulding's recess in at least some areas, in particular in an axial direction in relation to a longitudinal central axis of the plastic moulding and the moulding body, respectively. As an example, for this purpose, the contact element extends inwards from the moulding body in a radial direction. The recess adjoins the housing for the other plastic moulding which is also formed within the plastic moulding, more precisely within the moulding body. The housing and the recess together form a cavity which is present within the plastic moulding or the plastic moulding's moulding body.

For connecting the plastic moulding to the other plastic moulding via welding, it is contemplated to first arrange the other plastic moulding or the welding area of the other plastic moulding within the plastic moulding's housing. As as an example, the housing is stepped. Then welding is performed, thus in particular exposing the moulding arrangement to the laser beam or implementing other suitable actions for performing the appropriate welding method. Preferably, it is contemplated to displace the two plastic mouldings, i.e. the plastic moulding and the other plastic moulding, towards one another in a displacing direction during welding. The displacing direction used therein is preferably present towards the plastic moulding's longitudinal central axis and/or a longitudinal central axis of the other plastic moulding, or in parallel to it. As an example, the longitudinal central axis of the plastic moulding and/or the longitudinal central axis of the other plastic moulding correspond to the longitudinal central axis of a recess included in the respective plastic moulding, i.e. in the housing in the case of the plastic moulding.

In order to provide for a particularly process-stable execution of welding, at least the plastic moulding may include a particular configuration or design. As such, it includes the housing which is formed for housing the other plastic moulding or the welding area, respectively, in at least some areas. The housing can be present as a stepped housing. The stepped housing is intended to mean a recess of the plastic moulding having different cross-sections in the direction of a longitudinal central axis of the plastic moulding, i.e. having different dimensions or cross-sectional areas in cross-sections spaced from one another in an axial direction. The welding area is an area or sub-area of the other plastic moulding which is connected to the plastic moulding including the housing in a positive locking way through welding. Other configurations, in particular non-stepped configurations, of the housing are also readily realisable. As an example, in this case, the housing is embodied with unchanging dimensions in an axial direction.

If the housing is embodied as a stepped housing, a step is formed within it for the positive locking connection through welding, the step causing a change of the dimensions or cross-sectional area of the housing. Preferably, the step is a mating element or end stop, respectively, for the other plastic moulding. In this respect, a mating surface for the other plastic moulding is present at the step. Preferably, it is contemplated to introduce the other plastic moulding into the stepped housing until it abuts the step. Then, welding is performed. During welding, the other plastic moulding and the plastic moulding, in particular its step, are pressed against one another. Due to the plastic moulding's and/or other plastic moulding's material melted through welding, the two plastic mouldings can be displaced towards one another which is caused by applying an appropriate displacing force to the plastic moulding and/or the other plastic moulding.

Preferably, in at least some areas, in particular completely, the housing is cylindrical, in particular circularly cylindrical or non-circular. However, depending on an orientation of the step, other shapes of the housing may occur as well. Stated differently, it may be contemplated that the housing, in particular apart from the step, is cylindrical, in particular circularly cylindrical or non-circular, most preferably completely. Thus, in principle, the housing may take any configuration in cross section, in particular circular, ovoid, stadium shaped, polygonal or the like. As an example, at least in an axial direction, the housing extends from the recess and/or step up to an outlet opening of the housing opposed to the recess and/or step.

For performing laser welding, the laser beam is generated which subsequently melts the plastic moulding and/or the other plastic moulding. Preferably, the laser beam is oriented inwards in a radial direction. In this regard, an external welding is performed from the outside in a radial direction. With the laser beam's orientation in a radial direction, it is meant that a radial component of its orientation or its orientational sector is different from zero or that the laser beam only travels in a radial direction, the radial component therefore being the only component of the laser beam's orientation different from zero. In the case of a different welding method, heat is input into the plastic moulding and/or the other plastic moulding in another suitable way, such that it melts in some areas.

The laser beam may already be generated before the other plastic moulding is arranged within the housing, i.e., when the other plastic moulding is present outside of the housing. Alternatively, it may be contemplated that the laser beam is generated while introducing the other plastic moulding into the housing, thus, in particular, before the other plastic moulding abuts the step. Most preferably though, the other plastic moulding is first introduced into the housing as far as possible, thus, in particular, until it abuts the step of the plastic moulding. The laser beam for performing laser welding is generated only thereafter, and while the laser beam is present, the two plastic mouldings are displaced one towards the other.

Displacing one towards the other preferably occurs by applying a corresponding displacing force to the plastic moulding and/or the other plastic moulding. It may be contemplated to already exert the displacing force onto the plastic moulding and/or the other plastic moulding prior to performing welding, in particular prior to generating the laser beam. Additionally or alternatively, it may be contemplated to also exert the displacing force onto the plastic moulding and/or the other plastic moulding after an end of welding, thus, in particular, after deactivation of the laser beam, in form of a holding force, at least for a certain holding time, in particular precisely for the certain holding time. In order to displace the plastic mouldings one towards the other or to exert the displacing force, one of the plastic mouldings can be held fixed in place, and the displacing force can be applied to the other one, or the other one can actually be displaced. In this regard, it may be contemplated that for displacing the plastic moulding and the other plastic moulding one towards the other, only the plastic moulding, only the other plastic moulding or both plastic mouldings is/are displaced.

In a further design of the invention, the contact element includes a protrusion arranged in the recess and protruding towards the housing, in particular abutting an inner circumferential surface of the moulding body limiting the housing. As such, the protrusion is present within the cavity of the plastic moulding and at least partly extends through the recess towards the housing. Most preferably, it is flush with the recess, i.e., does not protrude the housing. Seen in a radial direction, the protrusion abuts the inner circumferential surface of the moulding body. The inner circumferential surface outwardly limits the housing in a radial direction. The protrusion includes an outer circumferential surface abutting the inner circumferential surface, preferably throughout its surface.

In another preferred design of the invention, the protrusion originates from a base body of the contact element, the base body being arranged at a front side of the moulding body, in particular abutting it. The protrusion protrudes the base body, in particular in an axial direction. The base body in turn is arranged at a front side of the moulding body or is present as an overlap with the front side when seen in a radial direction. This means that, seen in a radial direction, the base body overlaps with the moulding body's front side. Preferably, the base body abuts the front side of the moulding body or is connected to it. As an example, the base body is mounted to the front side of the moulding body, in particular in a substance-to-substance connection. However, a non-positive and/or positive locking mounting of the base body to the moulding body may also be contemplated.

According to another embodiment of the invention, the protrusion protrudes up to an inner edge of the step, in particular being flush with the step at the inner edge, such that upon assembly, the other moulding body abuts the protrusion within the housing. The inner edge implies an edge of the step which in a radial direction is internal. As an example, that area of the inner circumferential surface of the moulding body directly adjoins the inner edge which is abutted by the contact element or its protrusion, respectively. Preferably, the protrusion is flush with the step. According to such a design, the protrusion may abut the other moulding body once the latter is arranged within the housing abutting the step. As both the other plastic moulding and the contact element preferably consist of a laser absorbing material, in case of laser welding, further penetration of the laser beam into the plastic moulding in a radial direction or in the direction of its longitudinal central axis is prevented by the other moulding body meeting the protrusion. Rather, the laser beam is limited by the other plastic moulding and the protrusion together, in particular at least partly by the other plastic moulding and at least partly by the protrusion. This can at least partly be done by absorption of the laser beam.

According to another preferred embodiment of the invention, the plastic moulding includes a hollow cylinder element which is arranged within the recess and protrudes into the housing in a radial direction in a way limiting the housing inwardly. As an example, the hollow cylinder element serves flow guidance. In particular, the hollow cylinder element ensures that no melted material of the plastic moulding and/or the other plastic moulding reaches a flow carrying area of the plastic moulding. The hollow cylinder element is arranged within the recess and extends into the housing. In particular, it traverses the housing in an axial direction in at least some areas.

It may be contemplated that the outer circumferential surface of the hollow cylinder element includes grooves, or is traversed by these, which preferably extend in an axial direction, in particular each having a longitudinal central axis which is parallel to the plastic moulding's longitudinal central axis. In this regard, the grooves are present on the hollow cylinder element with an open end, in the radial direction, to the outside, and during welding, they function to accommodate or transport the melted material, in particular the plastic moulding, the other plastic moulding and/or the contact element.

As an example, the part of the hollow cylinder element protruding into the housing has dimensions, in an axial direction, which, with respect to the dimensions of the protrusion of the plastic moulding in the same direction, are greater, such as being at least 110%, at least 120%, at least 125%, at least 130%, at least 140%, or at least 150%. Preferably, the hollow cylinder element has a circularly cylindrical configuration, thus being present as a hollow circular cylinder element. A non-circular embodiment of the hollow cylinder element is also readily realisable. It inwardly limits the housing in a radial direction, namely with its outer circumferential surface.

In a further development of the invention, the hollow cylinder element consists of a laser transparent material and/or has a wall thickness which is less than a wall thickness of the moulding body and/or a wall thickness of the protrusion. In principle, the hollow cylinder element may have any configuration. This is particularly the case when the other moulding body abuts the protrusion, in particular at the front side, after having been arranged within the housing. In this case, it is prevented that the laser beam reaches the hollow cylinder element and heats it up during laser welding. However, due to possible tolerances, gaps may be present through which a part of the laser beam may cross through, such that at least a minor impact of the hollow cylinder element might occur. This is prevented by the design of the hollow cylinder element made up of the laster transparent material. In particular, this also allows to design the hollow cylinder element with a relatively small wall thickness, specifically in particular a wall thickness smaller than the wall thickness of the moulding body and/or the protrusion. Alternatively, in particular, when a welding method other than laser welding is used, the hollow cylinder element's material can nevertheless be electrically conductive. In the case of laser welding, it also most preferably may be contemplated that the material is chosen such that it is electrically conductive on the one hand and laser transparent on the other hand.

In another embodiment of the invention, the protrusion—seen in a radial direction—is arranged between the inner circumferential surface of the moulding body and an outer circumferential surface of the hollow cylinder element. Such an arrangement is particularly present in half-section. Accordingly, seen in the radial direction, the protrusion is arranged lying further outwardly than the hollow cylinder element's outer circumferential surface and lying further inwardly than the moulding body's inner circumferential surface. As an example, the protrusion extends parallel to the inner circumferential surface and/or outer circumferential surface which in turn may be parallel to each other. It may be contemplated that, in the radial direction, the protrusion is spaced from the inner circumferential surface on the one hand and from the outer circumferential surface on the other hand. However, it preferably abuts one of the surfaces, i.e. the inner circumferential surface or the outer circumferential surface, most preferably the moulding body's inner circumferential surface.

In another design of the invention, the hollow cylinder element and the contact element together include a receiving chamber for the melted material generated through welding, the receiving chamber adjoining the housing. Thus, the receiving chamber is limited by the hollow cylinder element in some areas and by the contact element in some areas. As an example, the hollow cylinder element limits the receiving chamber inwards in a radial direction, whereas the contact element limits the receiving chamber in an axial direction, in particular in the direction facing away from the plastic moulding and the housing, respectively. The receiving chamber adjoins the housing, thus preferably representing an area of the recess or being present within it.

Further, at least prior to the start of welding, the receiving chamber may be limited by the protrusion, namely outwardly in a radial direction. In this respect, seen in the radial direction, the receiving chamber is preferably present between the hollow cylinder element and the protrusion, thus, it is inwardly limited by the hollow cylinder element in the radial direction and outwardly limited by the contact element and the protrusion, respectively, in the radial direction. Finally, in the radial direction, the receiving chamber is also limited by the contact element, that is by its base body. The receiving chamber functions to receive melt generated through welding. Therein, the melt particularly implies melted material of the contact element, the plastic moulding, and/or the other plastic moulding.

In a most preferred further embodiment of the invention, the hollow cylinder element is mounted to the moulding body via the contact element and/or at least one crosspiece. Most preferably, the hollow cylinder element is mounted to the moulding body exclusively via the contact element, i.e. only indirectly. Accordingly, the contact element engages the hollow cylinder element on the one hand and the moulding body on the other hand. In principle, mounting of the contact element to the hollow cylinder element on the one hand and to the moulding body on the other hand, respectively, may have any configuration. As an example, non-positive, positive locking, and/or substance-to-substance mounting are contemplated.

Alternatively or additionally, it is understood that the hollow cylinder element can directly abut the moulding body and/or be mounted to it and/or be integrally formed therewith. As an example, such a connection between the hollow cylinder element and the moulding body is created via at least one crosspiece extending outward from the hollow cylinder element in a radial direction and thus—seen in half-section—extending towards the moulding body. The crosspiece may be configured integrally with the hollow cylinder element and/or the moulding body and/or consist of the same material as these. Preferably, a plurality of such crosspieces are contemplated, which most preferably are arranged in an even distribution in a circumferential direction. In an advantageous embodiment, the hollow cylinder element and the moulding body are configured integrally and consisting of the same material, being connected to one another via the crosspiece to this aim. In this case, forming of the hollow cylinder element, the moulding body and the crosspiece is contemplated during a common process step such as by injection moulding.

The contact element may be contemplated to be arranged to abut the crosspiece or the crosspieces, respectively, being supported by it or by them, respectively, in an axial direction. This is particularly the case if the contact element is present as a single piece. In this regard, a design is particularly advantageous in which the hollow cylinder element, the moulding body and the at least one crosspiece are configured integrally with each other and in which the contact element is inserted into the moulding body prior to welding, such that—seen in a radial direction in half-section—it is arranged between an outer circumferential surface of the hollow cylinder element and an inner circumferential surface of the moulding body, thereby being supported by the at least one crosspiece in the axial direction.

Preferably, the hollow cylinder element is press-fitted into the contact element, connected to it by lock-mounting or welded to it. Additionally or alternatively, the contact element can be press-fitted into the moulding body, mounted to it by lock-mounting or welding. It is understood that it may also be contemplated that the hollow cylinder element is produced integrally with the contact element, that the contact element is produced integrally with the moulding body and/or that the hollow cylinder element is produced integrally both with the contact element and the moulding body, such as by a multicomponent injection moulding method. In this regard, said elements consist of different materials processed simultaneously or subsequently during a common production method, thereby being connected to each other using a substance-to-substance connection.

In a further development of the invention, the protrusion is continuously formed in a circumferential direction or includes tabs in the circumferential direction that are spaced from each other. If the protrusion is continuously formed in the circumferential direction, it preferably has a continuous margin on its side facing the housing, the margin particularly continuously being in an imaginary plane which most preferably is perpendicular to a longitudinal central axis of the plastic moulding. Alternatively, a discontinuous margin may also be contemplated. In this case, the protrusion includes a plurality of tabs spaced from each other in a circumferential direction and each protruding towards the housing. Preferably, the tabs are arranged in an even distribution in the circumferential direction. However, in principle, an uneven arrangement may also be contemplated.

Finally, in a further embodiment of the invention, the protrusion may have an extension in an axial direction which is at least as great as the distance of the hollow cylinder element from the moulding body in a radial direction. During welding, the protrusion should also be melted in at least some areas such that it is deformed by the plastic moulding and the other plastic moulding being displaced one towards the other. In order to ensure reliable electrical contacting of the other plastic moulding with the contact element, it is of advantage if the protrusion, after having been deformed, extends over a majority of the front side, of the other plastic moulding, which faces the contact element.

Such is the case when the deformed protrusion—seen in half-section—extends from the hollow cylinder element up to the moulding body. Such a deforming is achieved if the protrusion has the extension mentioned above in the axial direction prior to deforming, i.e. prior to the start of welding, i.e. an extension at least corresponding to the distance of the hollow cylinder element from the moulding body in the radial direction, in particular seen in half-section again.

Preferably, the extension of the protrusion is greater than the distance, such as being at least 110%, at least 120%, at least 125%, at least 130%, at least 140%, or at least 150% with respect to the distance. In principle, the protrusion may have any shape, in particular being configured crosspiece-shaped, wherein seen in section, the crosspiece is angular, in particular rectangular, and may have a chamfer, in particular continuously in a circumferential direction. The chamfer may be present on the protrusion's side facing away from the moulding body in half-section.

Further, the invention relates to a moulding arrangement including a plastic moulding, in particular a plastic moulding as set forth above and another plastic moulding, the plastic moulding including a housing for the other plastic moulding, the housing being formed within a moulding body of the plastic moulding which consists of a weldable material in at least some areas. It is contemplated therein that a contact element is arranged on the moulding body, the contact element at least partly consisting of an electrically conductive material and limiting a recess of the moulding body adjoining the housing in at least some areas.

The advantages of such a design of the moulding arrangement as well as the plastic moulding have already been pointed out above. Both the moulding arrangement and the plastic moulding may be further developed as set forth above, therefore, reference is made thereto.

The moulding arrangement includes at least the plastic moulding and the other plastic moulding. These may be arranged independently from one another, i.e. be present as spaced from one another, as an example. Such is the case before welding is performed. However, the plastic moulding and the other plastic moulding may also already be fixed one to another through welding. In this case, the other plastic moulding is in electrical connection with the contact element and with the plastic moulding.

In a preferred further design of the invention, the other plastic moulding, when arranged within the housing, abuts a hollow cylinder element of the plastic moulding limiting the housing on the one hand and an inner circumferential surface of the moulding body on the other hand. Preferably, such is already the case before welding is started. In this regard, the inner circumferential surface limits the housing in which the other plastic moulding is arrangeable, outwardly in a radial direction. In contrast, the plastic moulding's hollow cylinder element inwardly limits the housing in the radial direction.

In a further design of the invention, the other plastic moulding consists of an electrically conducting material in at least some areas, in particular massively consisting of this material or including a conducting layer, in particular a conductive layer present as an inner coating, made up of this material. During welding, it is intended that this electrically conductive material makes electrical contact with the plastic moulding's contact element, thus establishing the electrical connection between the plastic moulding and the other plastic moulding. Most preferably, the electrically conducting material is present throughout the longitudinal extension of the other plastic moulding in the direction of its longitudinal central axis. As an example, the other plastic moulding is configured as a tubing as a flexible conduit. A particularly inexpensive realisation of the other plastic moulding is possible if the other plastic moulding includes the inner coating consisting of the electrically conducting material which optionally can also be laser absorbing.

In a further preferred design of the invention, the other plastic moulding includes a support supporting the conducting layer, the support including a material which is electrically less conductive than the conducting layer's material. In this regard, the conducting layer is applied or arranged on the support. Seen in a radial direction in relation to a longitudinal central axis of the other plastic moulding, the support—in particular where the conducting layer is configured as an inner coating—preferably has greater dimensions than the conducting layer, in particular significantly greater. As an example, the material thickness of the conducting layer, i.e. its extension in the radial direction, is at most 5%, at most 10%, at most 15%, at most 20%, or at most 25% of the support's material thickness.

The support consists of a material that for example is as laser absorbing as the material of the conducting layer. However, the electrical conductivity of the support's material preferably is in any case less than that of the conducting layer's material. In this regard, the material of the conducting layer differs from the material of the other plastic moulding, yet, it may include the same basic material. This has already been pointed out above. The support may consist of one layer or of several layers succeeding one another in a radial direction, in particular directly. As an example, the conducting layer is applied to one of these layers, but completely separated from the former layer by another one of the layers, i.e. spaced from it in a radial direction. However, it may also be contemplated that the conducting layer is present between two of the layers, i.e. abutting the one on the one hand and the other on the other hand. As an example, an outer one of the layers, i.e. an outer layer, consists of a material which is connectable to the material of the plastic moulding and the plastic moulding's moulding body, respectively, through welding, in particular through laser welding. In contrast, another layer laying between the conducting layer and the outer layer may in principle consist of any material that in particular does not need to be weldable or is not weldable. Thus, in principle, the arrangement of the conducting layer and the layers is random.

Finally, the invention relates to a method for producing a moulding arrangement including a plastic moulding, in particular a plastic moulding as set forth above and another plastic moulding, the plastic moulding including a housing for the other plastic moulding, the housing being formed within a moulding body of the plastic moulding which consist of a weldable material in at least some areas. Again, it is contemplated that a contact element is arranged on the moulding body, the contact element at least partly consisting of an electrically conductive material and, in at least some areas, limiting a recess of the moulding body adjoining the housing, wherein the plastic moulding and the other plastic moulding are displaced one towards the other in a displacing direction during welding.

In view of possible advantageous designs of the moulding arrangement as well as of the method for producing it, reference is again made to what is set forth above. In particular, the method for producing the moulding arrangement can be executed according to German patent application DE 10 2016 204 066 which is hereby referred to in it entirety. Preferably, the method may be further developed according to one or more claims of the German patent application.

It may be contemplated to perform welding as laser welding, spin welding, hot gas welding, infrared welding, vibration welding, ultrasound welding, friction welding, or high-frequency welding. Thus, in principle, the moulding arrangement can be produced by any welding method. Here, it is only of importance that the plastic moulding and the other plastic moulding are displaced one towards the other during moulding whereby the other plastic moulding makes abutting contact with the contact element. Here, it is to be noted that the displacing one towards the other does not necessarily have to occur while heat is input into the moulding arrangement. In this regard, welding comprises two separate operations, specifically inputting heat, such as using a laser in the case of laser welding, and displacing the plastic moulding and the other plastic moulding one towards the other. It may be contemplated that the displacing one towards the other occurs while heat is being input. However, additionally or alternatively, it can also be performed only after inputting heat.

As an example, it is contemplated that the other plastic moulding is arranged spaced from the contact element after arranging the other plastic moulding within the housing of the plastic moulding. Only through displacing one towards the other or during displacing one towards the other, which occurs during welding, do the other plastic moulding and the contact element make a connection with each other, in particular a mating contact and/or a substance-to-substance connection. Thereby, the electrical connection between the other plastic moulding and the contact element and thus between the other plastic moulding and the plastic moulding is established. Alternatively, the other plastic moulding may abut the contact element already before welding. Again, the electrical connection between the other plastic moulding and the contact element is established through welding, in particular through a substance-to-substance connection.

In another advantageous embodiment of the invention, a laser beam used for laser welding is oriented such that it impinges the other plastic moulding and/or—at least temporarily—the protrusion while penetrating the moulding body. Such is particularly the case in half-section. As already discussed above, the moulding body consists of a laser transparent material. Accordingly, the laser beam can penetrate the moulding body, in particular coming from the outside in a radial direction, i.e. entering the inside in the radial direction. Passing through the moulding body, the laser beam impinges on the other plastic moulding, melting it or rather the material it consists of.

Preferably, the laser beam additionally impinges on the protrusion at least temporarily such that it is also melted. It is understood that alternatively—in particular in the case of other welding methods—it may also be contemplated that heat from the melted material of the other plastic moulding is transferred to the protrusion via thermal conduction such as melting occurs due to this transferred heat. In either case, while welding is performed, a deforming of the protrusion is intended which is achieved by displacing the plastic moulding and the other plastic moulding one towards the other, wherein on the one hand the protrusion is fixed in relation to the plastic moulding and force is applied onto it from the other plastic moulding on the other hand. In principle, the protrusion may have any configuration. As an example, seen in a longitudinal section or a semi-longitudinal section, it has a crosspiece-like shape. It is understood that alternatively, it may also be triangular or pyramidal, as an example.

Finally, in another design of the invention, the protrusion can be heated up during welding with force being applied onto it by the plastic moulding and the other plastic moulding being displaced one towards the other such that it is deformed towards the base body and urged against a front side of the other plastic moulding. Thereby, deforming of the protrusion is effected such that it makes abutting contact, thus electrical contact, with the electrically conducting material of the other plastic moulding, i.e. such as the inner coating of the other plastic moulding. Due to the application of force upon the protrusion, it is urged against the front side of the other plastic moulding such that after welding, it is preferably connected to the electrically conduction material in a positive locking way. As an example, the melted material of the protrusion hereby reaches openings present on the front side, such as openings generated by means of melting the other plastic moulding and/or openings caused by roughness and/or irregularities of the other plastic moulding, such as ridges or the like.

Most preferably, it is contemplated that the other plastic moulding is only making a connection with the contact element, in particular an electrical connection, during welding. As an example, the other plastic moulding is arranged spaced from the contact element prior to welding, in particular directly before welding, as an example at least directly at the start of welding. It only makes contact with the contact element during welding such that the electrical connection is established between them. However, it is understood that the other plastic moulding may abut the contact element already at the start of welding. In particular by the plastic moulding and the other plastic moulding being displaced one towards the other during welding, the other plastic moulding, in particular its melted material, is pressed against the contact element. This can result in a thermal transfer, such that the contact element's material also melts and combines with the other plastic moulding's material, which in particular occurs with an electrically conducting connection being established.

With other words, it is contemplated that during welding, the other plastic moulding and/or the contact element are/is melted and that the melted material from the other plastic moulding and/or contact element combines with the respective other element or rather with the melted material of the respective other element such that an electrical connection is established. In either case, it is contemplated that the contact element makes a connection with the electrically conducting material of the other plastic moulding. To this aim, the other plastic moulding, the contact element or both are deformed and form a positive locking connection among them with the electrical connection being established between them.

In a further embodiment of the invention, the position of the plastic moulding relative to the other plastic moulding may be determined over time, in particular at least at one point in time, and evaluated in view of quality control of the moulding arrangement. The period of measurement, in which the relative position is determined at least once, comprises e.g. a welding period which e.g. extends from a start of laser welding, i.e. from the laser beam being generated, to the end of laser welding, i.e. to the laser beam being powered off. Additionally, the period of measurement may comprise a holding period directly following the laser welding or welding period, i.e. the powering off of the laser beam. The holding period preferably extends over a particular period during which the two plastic mouldings continue to be displaced one towards the other or at least, the displacing force continues to be applied to them.

Within the period of measurement, the relative position is determined at least one, in particular multiple times, most preferable continually or periodically. If the relative position corresponds to a reference value or if it is within a reference value range, it is assumed that the moulding arrangement is acceptable. However, if the relative position deviates from the reference position or if it is not within the reference value range, an incorrectly produced moulding arrangement is identified. It is understood that therein, the reference value or the reference value range, respectively, is independent from the point in time at which the relative position is determined. If within the period of measurement, the relative position is determined multiple times, i.e. in particular in form of an evolution of the relative position, this evolution of the relative position can be compared to a reference value evolution or the reference value range. If it corresponds to it or is within it, respectively, a correctly produced moulding arrangement is again extrapolated whereas otherwise, the incorrectly produced moulding arrangement is identified.

Such a procedure already allows a highly reliable monitoring of the method of production and a good quality control. However, in practice, the reference value range mentioned may not be chosen as finally scaled as actually desired due to various influencing factors. Thus, in order to further improve quality control, it is contemplated that an electric resistance present between the plastic moulding, in particular the contact element, and the other plastic moulding, in particular an area of the other plastic moulding made up of an electrically conductive material, is determined or that the presence of an electrically conductive connection between the plastic moulding, in particular the contact element, and the other plastic moulding is tested for. Using the resistance, correct forming of the moulding arrangement can be tested for. If the resistance is lower than or equal to a particular resistance threshold, it is assumed that the moulding arrangement is acceptable. However, if the resistance is higher than the resistance threshold, an incorrectly produced moulding arrangement is identified. Additionally or alternatively, correct production of the moulding arrangement is identified if the connection is present, the incorrectly produced moulding arrangement being identified if the connection is not present.

Preferably, the resistance and presence of the connection, respectively, is determined at least at one point in time. As an example, it is contemplated to perform determining if using the relative position it is identified that the plastic mouldings have reached or at least should have reached their final position or relative position. Alternatively or additionally, it may be contemplated to displace the plastic mouldings one towards the other until the resistance value is lower than or equal to the resistance threshold or the electrical connection is present. It may be contemplated to perform quality control either alone using the relative position or alone using the resistance or the electrical connection, respectively. However, a combination of both methods is most preferred. An exemplary procedure for this has already been pointed out above. However, it is understood that such a combination of both methods may principally be designed in any way.

In monitoring the position of the plastic moulding relative to the other plastic moulding, it can be assumed the moulding arrangement has been correctly formed when the reference value and a minimum welding depth, respectively, have been reached or exceeded. Once this condition is met, the electrical connection is normally also present. This in turn leads to the conclusion that, if the electrical connection is present, correct forming of the moulding arrangement is also ensured.

As already discussed above, it may be contemplated to only monitor the relative position, but not the resistance during displacing of the plastic moulding and the other plastic moulding one towards the other. When the relative position reaches the reference value, in particular the minimum welding depth, displacing is terminated and resistance tested. If the latter is sufficiently low, i.e. lower than or equal to the resistance threshold, correct forming of the moulding arrangement is identified, with incorrect forming being otherwise identified.

However, it may also be contemplated to only monitor resistance and not the relative position during displacing. Once resistance reaches or falls below the resistance threshold, displacing is terminated and correct forming of the moulding arrangement is assumed. If the resistance threshold is not reached by the resistance until an end stop limiting displacing is reached, incorrect forming is identified.

An embodiment is preferred in which both the relative position and the resistance are monitored during displacing. If the relative position reaches or exceeds the minimum welding depth or if resistance reaches or falls below the resistance threshold, displacing is terminated and correct forming of the moulding arrangement identified; otherwise, incorrect forming is identified. If there is a deviation of the relative position from the reference value or the reference value range during displacing or when the end stop is reached, incorrect forming is identified.

BRIEF DESCRIPTION OF THE DRAWINGS

In the following, the invention is explained in more detail using exemplary embodiments shown in the drawing, without limiting the invention. Therein:

FIG. 2 shows a schematic diagram of the moulding arrangement during a laser welding operation at a first time;

FIG. 3 shows a schematic diagram of the moulding arrangement during the laser welding operation at a second time; and FIG. 4 shows a schematic diagram of the moulding arrangement during a third time following completion of the laser welding method.

DESCRIPTION OF EXAMPLE EMBODIMENTS

Figure 1:
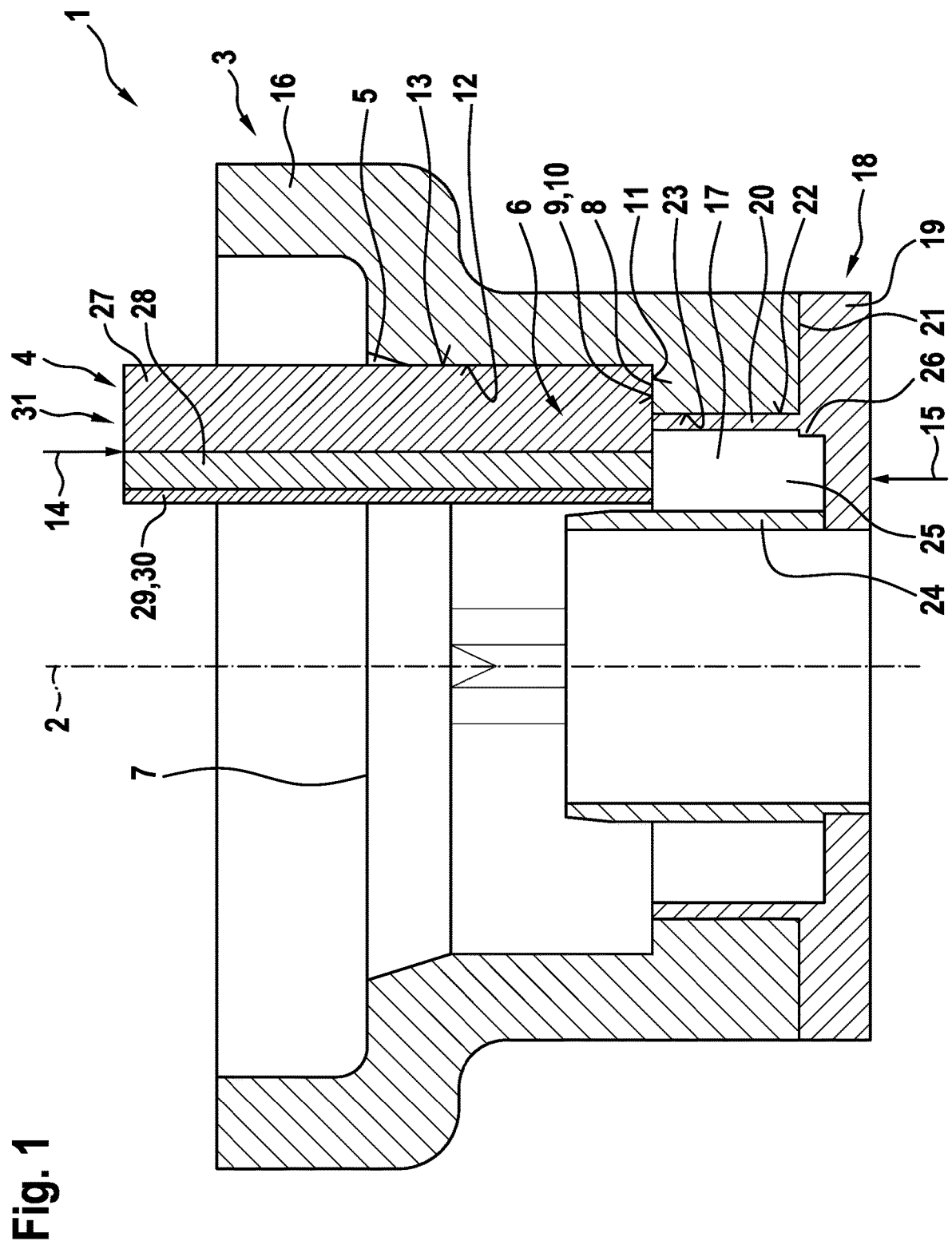
FIG. 1 shows a schematic diagram of a moulding arrangement including a first plastic moulding and a second plastic moulding.

FIG. 1 shows a schematic diagram of a moulding arrangement 1 in longitudinal section in relation to a longitudinal central axis 2. Said moulding arrangement 1 includes a first plastic moulding 3 and second plastic moulding 4 which is only shown in half-section herein. As an example, both plastic mouldings 3 and 4 may be configured as fluid conducting elements.

Herein, they are each merely illustrated by way of example and schematically. Preferably, the first plastic moulding 3 is a fluid coupling and the second plastic moulding 4 is a fluid conduit. In principle, the plastic mouldings 3 and 4 may be produced in any way, e.g. through injection moulding or extrusion. Preferably, the first plastic moulding 3 is an injection-moulded moulding and the second plastic moulding 4 is an extruded moulding. However, other embodiments are also possible.

The first plastic moulding 3 includes a housing 5 for the second plastic moulding 4 and for a welding area 6 of the second plastic moulding 4. The housing 5 includes an outlet opening 7 formed at the first plastic moulding 3 at the front side and is limited by a step 8 on the side opposite the outlet opening 7—when seen in an axial direction. In this regard, said housing 5 is configured as a stepped housing. Said step 8 causes a change of the dimensions or of the inner cross-sectional area of the housing 5. Preferably, in the exemplary embodiment illustrated herein, it also forms an end stop for the second plastic moulding 4. Accordingly, the plastic mouldings 3 and 4 are configured such that the second plastic moulding 4 can be introduced into the housing 5 until step 8 is reached, subsequently abutting it or being supported by it.

Within the housing 5, a first welding surface 9 is formed which is disposed within a first surface of rotation with at least a subsurface 10. The first welding surface 9 or the subsurface 10 faces the second plastic moulding 4. Preferably, the first welding surface 9, in particular the subsurface 10, is formed by the step 8. Preferably, the first welding surface 9 or its subsurface 10 is annular, in particular circular. However, a non-circular configuration of the welding surface 9 or the subsurface 10 is also possible. A second welding surface 11 is formed at the front side of the second plastic moulding 4. The second welding surface is present in a second surface of rotation and faces the first plastic moulding 3. The second welding surface 11 abuts the first welding surface 9, in particular the subsurface 10 of the first welding surface 9. In the exemplary embodiment illustrated herein, the front side of the second plastic moulding 4 is larger than step 8 in a radial direction such that, seen in cross-section, the second plastic moulding 4 protrudes inwards over step 8.

The first welding surface 9 is joined by an inner circumferential surface 12 of the first plastic moulding 3 limiting the housing 5 outwardly in a radial direction. Preferably, in an axial direction, said inner circumferential surface 12 extends from the first welding surface 9 up to the outlet opening 7 through which the second plastic moulding 4 is introducible into the housing 5. Preferably, said inner circumferential surface 12 is cylindrical, in particular circularly cylindrical. However, a non-circular design of the inner circumferential surface 12 can also be realised. As an example, it forms a particular angle, in particular 90°, with the first welding surface 9 or the subsurface 10. By contrast, the second welding surface 11 adjoins to an outer circumferential surface 13 of the second plastic moulding 4. The outer circumferential surface 13 may also be cylindrical, in particular circularly cylindrical, and preferably forms an angle, in particular an angle of 90°, with the second welding surface 11, at least in some areas or continuously—when seen in a circumferential direction.

The plastic mouldings 3 and 4 are formed such that the inner circumferential surface 12 and the outer circumferential surface 13—when seen in a circumferential direction—are in any case not or are if necessary arranged with press fit in relation to each other in some areas, but only with a clearance fit or transition fit. Preferably, it is contemplated that the outer circumferential surface 13 is also formed by ribs not illustrated herein which are formed spaced apart from each other at the plastic moulding 4 in a circumferential direction and which protrude towards the plastic moulding 3 or the outer circumferential surface 12 in a radial direction. As an example, the inner circumferential surface 13—seen in the circumferential direction—abuts the inner circumferential surface 12 only in the area of the ribs, abutting areas betweens the ribs with low surface pressure or not at all. In the latter case, the outer circumferential surface is arranged in the areas betweens the ribs, i.e. spaced from the inner circumferential surface. Each rib's longitudinal central axis is in the axial direction, i.e. preferably parallel to the longitudinal central axis 2. They function to easily and reliably centre the plastic moulding 4 in relation to the plastic moulding 3 and can thus also be referred to as centring ribs.

In the embodiment illustrated herein, the first surface of rotation and the second surface of rotation are arranged in parallel, both each being perpendicular to the longitudinal central axis 2 or to a displacing direction of the plastic mouldings 3 and 4 shown by arrows 14 and 15, the direction in which these are displaced one towards the other during a welding operation such as a laser welding operation. Preferably, the displacing direction is parallel to the longitudinal central axis 2 or coincides with it. In the embodiment illustrated herein, the two surfaces of rotation are disposed in the same plane or in at least two planes arranged in parallel.

In the embodiment illustrated herein, the first plastic moulding 3 includes a moulding body 16 within which the housing 5 is formed. Within the moulding body 16, a recess 17 adjoins the housing 5, the recess being present on that side of the housing 5 which faces away from the outlet opening 7. The recess 17 is limited by a contact element 18 in at least some areas which in the exemplary embodiment illustrated herein includes a base body 19 from which a protrusion 20 extends towards the housing 5. Preferably, the protrusion 20 is formed crosspiece-like. The contact element 18, in particular its base body 19, abuts a front side 21 of the moulding body 16. Concurrently, the protrusion 20 abuts an inner circumferential surface 23 with an outer circumferential surface 22, in particular continuously in a circumferential direction and/or over its entire extension in an axial direction.

A hollow cylinder element 24 is mounted to the moulding body 16 above the contact element 18. As well as the contact element 18 and the moulding body 16, the hollow cylinder element 24 is a component part of the plastic moulding 3. Preferably, the hollow cylinder element 24 is configured as a hollow circular cylinder. However, the hollow cylinder element 24 may also be non-circular. It functions to direct fluid through the first plastic moulding 3. Preferably, in an axial direction, the hollow cylinder element 24 extends from the contact element 18 or rather its base body 19 to and beyond the step 8, i.e. up into the housing 5. Accordingly, the hollow cylinder element 24 limits a sub-chamber of the recess 17, specifically inwards in a radial direction. On the other hand, the sub-chamber is limited by the contact element 18, specifically in particular in a direction, from the base body 19, facing away from the housing 5 in an axial direction and outwards from the protrusion 20 in a radial direction. As an example, the sub-chamber functions as a receiving chamber 25 for melted material accumulating while the plastic mouldings 3 and 4 are connected through welding.

In the embodiment illustrated herein, the base body 19 is stepped, i.e. including at least one step 26. Accordingly, it includes a radially internal area and a radial external area, wherein the protrusion 20 originates from the latter. The radially internal area and the radially external area align on their sides facing away from the housing 5. However, towards the housing 5, the radially external area has an extension in an axial direction. Preferably, both areas are each present as a circular ring or they are configured non-circularly.

Further, in the embodiment illustrated herein, the second plastic moulding 4 is multi-layered, therefore including multiple layers, herein layers 27, 28, and 29, as an example. As an example, layers 27, 28, and 29 consist of different materials. Therein, it is in particular contemplated that the layer 27 arranged directly adjacent the inner circumferential surface 12 outwardly limiting the housing 5 in a radial direction consists of a material which is weldable with the material of the first plastic moulding 3 or the moulding body 16. In contrast, layer 28 may be formed as a filling layer and therefore consist of a material which is not weldable with the material of the first plastic moulding 3 or the moulding body 16, in particular of an inexpensive material. In contrast, layer 29 is preferably configured such that it has sufficient resilience against a fluid to be transported within the second plastic moulding 4. As an example, layer 29 consists of PA6.12 or PA12. Layer 28 may consist of PA6, whereas layer 20 is made from PPA or fluoropolymer as an example. Preferably, the first plastic moulding 3 or the moulding body 16 consists of the same material or at least the same basic material as layer 27.

Preferably, the moulding body's 16 material is laser transparent and the contact body's 18 material laser absorbing. As an example, the material of at least one of layers 27 and 28 is laser absorbing, preferably the material of layer 27. It is understood that the material of both layers 27 and 28 may be laser absorbing as well. Preferably, the material of layer 29 is also laser absorbing. In contrast, the material of the hollow cylinder element 24 preferably is laser transparent. Additionally or alternatively, it is contemplated that layer 29 is electrically conductive and therefore consists of a material having better conductivity than the material of layer 27 additionally or alternatively of layer 28. Preferably, layer 29 is present as an inner coating 30 which is applied to a support 31 of the second plastic moulding 4. In the exemplary embodiment illustrated herein, the support is formed by layers 27 and 28. As the material of layer 29, the contact element's 18 material is electrically conductive. At least, it has better electrical conductivity than the material of the moulding body 16 and/or the material of the hollow cylinder element 24.

FIG. 2 shows a moulding arrangement 1 during a welding operation at a first time. A laser beam 32 used for performing a laser welding operation is depicted. However, it is understood that welding may be performed using any welding method. By way of example only, a laser welding method is referred to in this description. However, this may be replaced by any other welding method at any time. For the sake of clarity, layers 27 and 28 are not illustrated separately from each other, but rather only the support 31. The time corresponding to the depicted moulding arrangement 1 occurs right at the start of welding. At this time, the second plastic moulding 4 is arranged within the housing 5 of the first plastic moulding 3, in such a way that the second plastic moulding 4 abuts the step 8 at the front side, preferably also the contact 18, in particular its protrusion 20. As the material of the moulding body 16 is laser transparent, but the materials of the support 31 and of the contact element 18 are not, these are melted as both are being exposed to the laser beam 32.

This is shown in FIG. 3 where the moulding arrangement 1 is illustrated at a second time following the first time. At the second time, the plastic mouldings 3 and 4 were displaced one towards the other in an axial direction in relation to the longitudinal central axis 2. Due to the materials of the second plastic moulding 4 and optionally of the first plastic moulding 3 being melted during welding, the second plastic moulding 4 reaches the recess 17 adjoining the housing 5. In particular, the melted material of the second plastic moulding 4 reaches the receiving chamber 25. Due to the plastic mouldings 3 and 4 being displaced one towards the other, the protrusion 20 is deformed; in the exemplary embodiment illustrated herein, it is bent inwards in a radial direction. However, other deformations may also occur which are substantially dependent on the geometry of the plastic mouldings 3 and 4. In either case, it is desirable that protrusion 20 is bent towards layer 29, thus approaching it, in particular in a radial direction.

This state present after welding is completed is illustrated in FIG. 4. Accordingly—if the laser welding method has been used—the laser beam 32 is deactivated and not depicted any more. It becomes clear that layer 29 is in contact with the protrusion 20 which is accordingly bent. By the plastic mouldings 3 and 4 being displaced one towards the other, the protrusion 20, in particular the melted material of the protrusion 20, is urged against the second plastic moulding 4, in particular against layer 29. In this regard, the electrically conductive material of the contact element 18 and the layer 29 are in abutting contact with each other such that an electrical contacting of the plastic mouldings 3 and 4 is realised.

The moulding arrangement 1 described herein, in particular in conjunction with the also described procedure for connecting the moulding arrangements 3 and 4 with each other, provides for a reliable electrical contacting, at the same time providing for high mechanical strength of the moulding arrangement 1 produced through welding. It is to be noted that the procedure described may also be used with a design of the plastic moulding 3 in which the protrusion 20 is not present.

The invention claimed is:

1. A plastic moulding for a moulding arrangement having a housing, stepped due to the formation of a step, for another plastic moulding of the moulding arrangement, wherein the stepped housing is formed within a moulding body of the plastic moulding, which moulding body consists of a weldable material in at least some areas, wherein on the moulding body, a contact element consisting at least partly of an electrically conductive material and limiting a recess of the moulding body adjoining the housing is arranged in at least some areas, wherein the contact element includes a protrusion arranged in the recess and projecting towards the housing up to an inner edge of the step.

2. The plastic moulding according to claim 1, wherein the protrusion abuts an inner circumferential surface of the moulding body limiting the housing.

3. The plastic moulding according to claim 1, wherein the protrusion originates from a base body of the contact element, the base body being arranged at a front side of the moulding body, in particular abutting it.

4. The plastic moulding according to claim 1, wherein the plastic moulding includes a hollow cylinder element which is arranged within the recess and projects into the housing in a radial direction to limit the housing inwardly.

5. The plastic moulding according to claim 1, wherein the hollow cylinder element consists of a laser-transparent material and/or has a wall thickness which is less than a wall thickness of the moulding body and/or a wall thickness of the protrusion.

6. The plastic moulding according to claim 1, wherein the hollow cylinder element is mounted on the moulding body via the contact element and/or at least one crossmember.

7. The plastic moulding according to claim 1, wherein the protrusion is continuously formed in a circumferential direction or includes spaced apart tabs in the circumferential direction.

8. The moulding arrangement according to claim 1, wherein the other plastic moulding consists of an electrically conducting material in at least some areas, in particular solidly consisting of this material or including a conducting layer, in particular a conductive layer present as an inner coating, made up of this material.

9. The moulding arrangement according to claim 1, wherein the other plastic moulding includes a support supporting the conducting layer, the support including a material which is electrically less conductive than the material of the conducting layer.

10. The method according to claim 1, wherein a laser beam used for welding is oriented such that it impinges the other plastic moulding and/or—at least temporarily—the protrusion while penetrating the moulding body.

11. A moulding arrangement having a plastic moulding and another plastic moulding, wherein the plastic moulding includes a housing, stepped due to the formation of a step, for the other plastic moulding formed within a moulding body of the plastic moulding consisting of a weldable material in at least some areas, wherein on the moulding body, a contact element consisting at least partly of an electrically conductive material and limiting a recess of the moulding body adjoining the housing is arranged in at least some areas, wherein the contact element includes a protrusion arranged in the recess and projecting towards the housing up to an inner edge of the step.

12. The moulding arrangement according to claim 11, wherein the other plastic moulding, when arranged within the housing, abuts a hollow cylinder element of the plastic moulding limiting the housing, on the one hand, and an inner circumferential surface of the moulding body on the other.

13. A method for producing the moulding arrangement having a plastic moulding and another plastic moulding, wherein the plastic moulding includes a housing for the other plastic moulding which is formed within a moulding body of the plastic moulding consisting of a weldable material in at least some areas, wherein on the moulding body, a contact element is arranged consisting at least partly of an electrically conductive material and limiting a recess of the moulding body adjoining the housing in at least some areas, wherein the contact element includes a protrusion arranged in the recess and projecting towards the housing, wherein the plastic moulding and the other plastic moulding are offset one towards the other in an off-setting direction during welding, wherein the protrusion is heated up during welding with force being applied onto it by the plastic moulding and the other plastic moulding being offset one towards the other such that it is deformed towards the base body and pressed against a front side of the other plastic moulding.

14. The method according to claim 13, wherein welding may be performed as laser welding, spin welding, hot-gas welding, infrared welding, vibration welding, ultrasound welding, friction welding, or high-frequency welding.

* * * * *